United States Patent [19]
Coburn et al.

[11] Patent Number: 5,366,781
[45] Date of Patent: * Nov. 22, 1994

[54] ORIENTED, SHAPE ARTICLES OF LYOTROPIC/THERMALLY-CONSOLIDATABLE POLYMER BLENDS

[75] Inventors: John C. Coburn, Wilmington, Del.; Hung H. Yang, Richmond, Va.

[73] Assignee: E. I. Du Pont de Nemours and Company, Wilmington, Del.

[*] Notice: The portion of the term of this patent subsequent to Nov. 20, 2007 has been disclaimed.

[21] Appl. No.: 892,145

[22] Filed: Jun. 5, 1992

Related U.S. Application Data

[63] Continuation of Ser. No. 337,505, Apr. 13, 1989, abandoned.

[51] Int. Cl.$^5$ .............. B32B 5/12; B32B 27/34; C08L 77/00; C08L 77/10
[52] U.S. Cl. .................. 428/113; 428/294; 428/474.7; 428/474.9; 428/532; 525/432; 525/434; 525/435; 525/436
[58] Field of Search ........... 525/432; 428/474.4, 428/474.7, 294, 475.5, 113

[56] References Cited

U.S. PATENT DOCUMENTS

| | | | |
|---|---|---|---|
| 3,767,756 | 11/1973 | Blades | 264/184 |
| 3,869,429 | 4/1975 | Blades | 260/78 S |
| 4,228,218 | 11/1980 | Takayanagi | 525/58 |
| 4,340,559 | 7/1982 | Yang | 264/181 |
| 4,464,323 | 8/1984 | O'Brien | 264/187 |
| 4,631,318 | 12/1986 | Hwang et al. | 525/432 |
| 4,725,394 | 2/1988 | O'Brien | 264/187 |
| 4,728,698 | 3/1988 | Isayev et al. | 525/439 |
| 4,810,735 | 3/1989 | Uy | 524/157 |
| 4,963,298 | 10/1990 | Allen et al. | 264/12 |
| 4,972,028 | 11/1990 | Uy | 525/432 |
| 5,225,489 | 7/1993 | Prevorsek et al. | 525/131 |

FOREIGN PATENT DOCUMENTS

| | | |
|---|---|---|
| 57-183420 | 11/1982 | Japan . |
| 59-163418 | 9/1984 | Japan . |
| 2195672 | 4/1988 | United Kingdom . |

OTHER PUBLICATIONS

Thermoplastic Molecular Composite Development, Copy of slides from presentation Apr. 29, 1988, at Darpa Polymer Program Review, Arlington, Va.

*Primary Examiner*—Ana L. Carrillo

[57] ABSTRACT

An oriented, shaped article comprising at least about 55% and less than about 80% by weight of a first polymer phase of at least one lyotropic polymer and at least about 20% and less than about 45% by weight of a second polymer phase of at least one thermally-consolidatable polymer and consolidated parts made therefrom.

19 Claims, 6 Drawing Sheets

5μm

5μm

5μm

5μm

250μm

250μm

250μm

250μm

ORIENTED, SHAPE ARTICLES OF LYOTROPIC/THERMALLY-CONSOLIDATABLE POLYMER BLENDS

This is a continuation of application Ser. No. 07/337,505 filed Apr. 13, 1989, now abandoned.

BACKGROUND OF THE INVENTION

The present invention relates to composite materials and more particularly relates to oriented, shaped articles including fibers and films of lyotropic/thermally-consolidatable polymer blends having composite utility.

High modulus fibers such as poly(p-phenylene terephthalamide) sold under the trademark Kevlar® by E. I. du Pont de Nemours and Company are useful for incorporation into polymeric matrix materials to produce composites. For some types of composites with thermoplastic polymer matrices, it is desirable to coat the high modulus fiber with the matrix polymer to produce a coated fiber known as a "prepreg" which can be directly molded into a composite by the application of heat and pressure. However, good quality "prepregs" are difficult to produce since wetting the fiber with the matrix polymer is often difficult. Also, these prepregs are expensive due to the separate process steps necessary to apply the matrix polymer coating.

SUMMARY OF THE INVENTION

In accordance with the invention, oriented, shaped articles having at least about 55 percent and less than about 80 percent by weight of a first polymer phase of at least one lyotropic polymer and at least about 20 percent and less than about 45 percent by weight of a second polymer phase of a thermally-consolidatable polymer. The first polymer phase is at least substantially continuous in the direction of orientation in the fiber when viewed at a magnification of 9,000× with transmission electron microscopy and with the second polymer phase interpenetrating the first polymer phase throughout the article. In a preferred form of the present invention, the lyotropic polymer of the first polymer phase is a para-aramid polymer, most preferably poly(p-phenylene terephthalamide). In this form of the invention, it is preferred for the first polymer phase and the second polymer phase to be co-continuous.

The invention provides fibers, films and other shaped, oriented articles which, as spun, can be formed directly by the application of heat and pressure into novel consolidated parts.

DETAILED DESCRIPTION OF THE INVENTION

Figure 1:
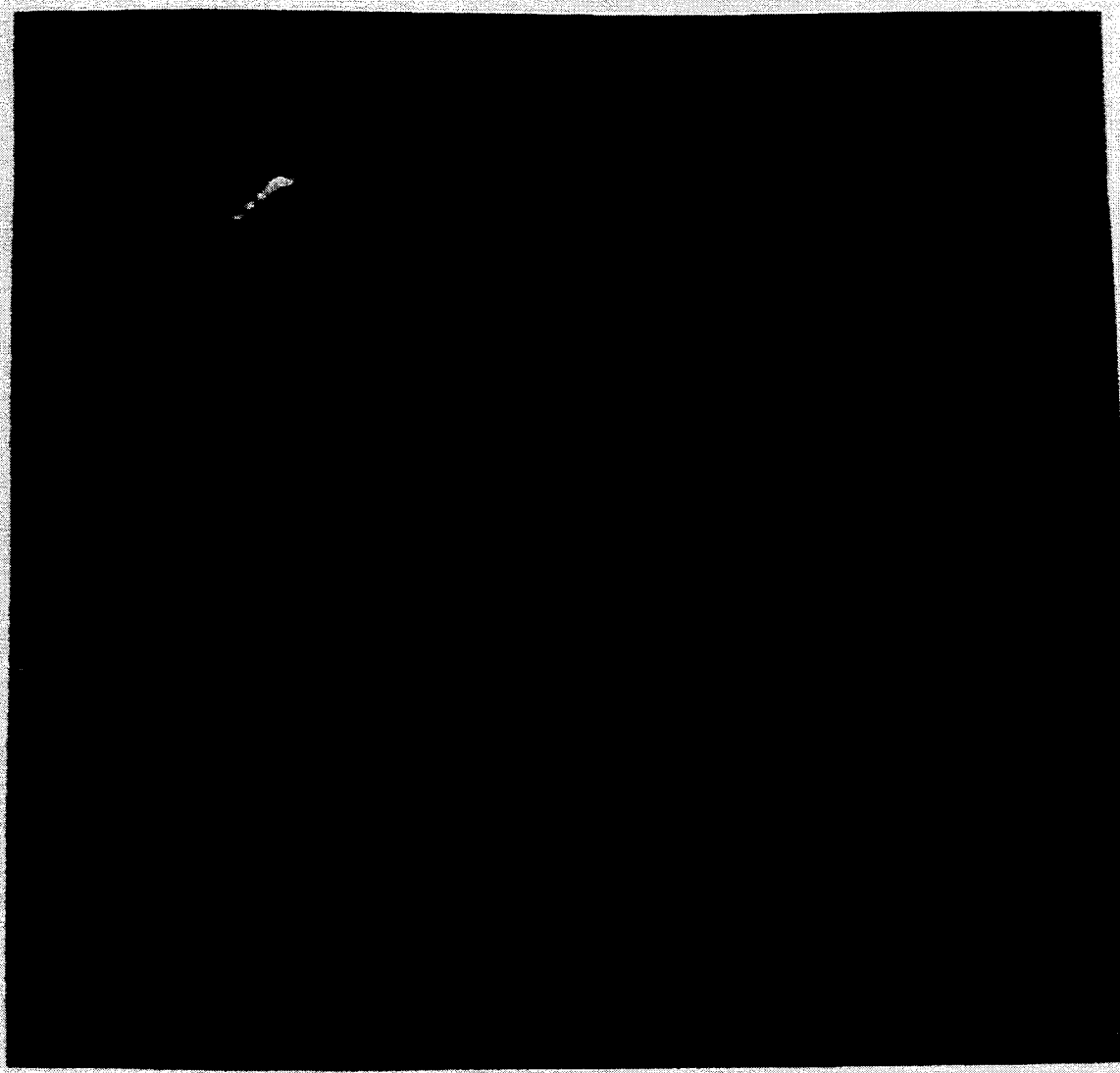
FIG. 1 is a transmission electron micrograph at 9,000× in cross-section of a preferred fiber in accordance with the present invention.

The oriented, shaped articles of the invention are comprised of a blend of at least one lyotropic polymer and at least one thermally-consolidatable polymer. The term "lyotropic polymer" is intended to refer to a class of polymers which have a high persistence length and function as a "rigid rod" in solution. Thus, lyotropic polymers are capable with an appropriate solvent of forming an anisotropic solution, i.e., microscopic domains of the solution are birefringent and a bulk sample of the solution depolarizes plane polarized light due to the alignment of polymer chains in the domains which causes the light transmission properties of the domains to vary with direction. Aromatic polyamides and aromatic-heterocyclic polymers with chain extending bonds from aromatic/heterocyclic groups are either coaxial or are parallel and oppositely directed, and polysaccharides with (1,4)-$\beta$-linkages in the backbone such as cellulose, cellulose derivatives, and chitin, and chitin derivatives are representative of this class of polymers.

Preferred lyotropic polymers for use in this invention are a class of aromatic polyamides referred to as para-aramids. The term para-aramid in the present application is intended to refer to para-oriented, wholly aromatic polycarbonamide polymers and copolymers consisting essentially of recurring units of formulas I and II below

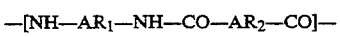
$$-[NH-AR_1-NH-CO-AR_2-CO]- \quad\quad I$$

$$-[NH-AR_1-CO]- \quad\quad II$$

wherein $AR_1$ and $AR_2$, which may be the same or different, represent divalent, para-oriented aromatic groups. By para-oriented is meant that the chain extending bonds from aromatic groups are either coaxial or are parallel and oppositely directed, e.g., substituted or unsubstituted aromatic groups including 1,4-phenylene, 4,4'-biphenylene, 2,6-naphthylene, 1,5-naphthalene, and 4,4'-Ph-X-Ph- or 3,4'-Ph-X-Ph-, where Ph is a phenylene ring, and X is O, CO, S, SO$_2$, NH, NH—CO or (CH$_2$)$_n$ with n=1–4. Substituents on the aromatic groups should be nonreactive and, as will become apparent hereinafter, must not adversely affect the characteristics of the polymer for use in the practice of this invention. Examples of suitable substituents are chloro, lower alkyl and methoxy groups. As will also become apparent, the term para-aramid is also intended to encompass para-aramid copolymers of two or more para-oriented comonomers including minor amounts of comonomers where the acid and amine functions coexist on the same aromatic species, e.g., copolymers produced from reactants such as 4-aminobenzoyl chloride hydrochloride, 6-amino-2-naphthoyl chloride hydrochloride, and the like. In addition, para-aramid is intended to encompass copolymers containing minor amounts of comonomers containing aromatic groups which are not para-oriented, such as, e.g., m-phenylene and 3,4'-biphenylene.

The inherent viscosity of the para-aramid in the preferred articles of the invention should be greater than about 3 dl/g. The most preferred lyotropic polymer for the invention is poly(paraphenylene terephthalamide) having an inherent viscosity of greater than about 4 dl/g.

Aromatic-heterocyclic polymers useful as the lyotropic polymer for this invention include poly(paraphenylene benzobisthiazole) (PBT), poly(paraphenylene benzobisoxazole) (PBO), and poly(paraphenylene benzobisimidazole) (PBIAB). Preferred are PBT and PBO, the use of which in blend fibers is disclosed in U.S. Pat. No. 4,810,735. The disclosure of U.S. Pat. No. 4,810,735 which is hereby incorporated by reference.

Polysaccharides with (1,4)-β-linkages in the backbone include cellulose and cellulose derivatives and chitin and chitin derivatives. The chain extending (1,4)-β-linkages contribute to the polymer exhibiting rod-like behavior in solution. Cellulose refers to poly-1,4-β-D-glucopyranose. Cellulose derivatives are obtained by substitution of the cellulose hydroxyls through reactions common to primary and secondary alcoholic groups such as esterification and etherification, e.g., cellulose derivatives include ethyl cellulose, hydroxypropyl cellulose, cellulose acetate, cellulose triacetate, cellulose acetate butyrate, and the like. Chitin refers to poly-N-acetyl-D-glucosamine. Though cellulose and chitin found naturally with the $C_5$–$C_6$ bond in the D-configuration, the invention defined herein would be just as applicable to an L-form and is not intended to be limited to the D-form. Examples of chitin derivatives include chitin acetate which refers to poly-N-acetyl-O-acetyl-D-glucosamine, chitin acetate/formate which refers poly-N-acetyl-O-acetyl-N-formyl-O-formyl-D-glucosamine, chitosan which is obtained by de-N-acetylation of chitin and refers to poly-D-glucosamine, and chitosan acetate/formate which refers to poly-N-formyl-N-acetyl-O-acetyl-O-formyl-D-glucosamine. Preferred is cellulose triacetate which is disclosed in U.S. Pat. Nos. 4,464,323 and 4,725,394, the disclosures of which are hereby incorporated by reference the polymer blend includes at least one thermally-consolidatable polymer. The term thermally-consolidatable polymer is intended to refer to any of a wide variety of polymers which can be consolidated with application of heat and pressure by mechanisms including melting, softening, and chemical reaction. Preferred for this purpose are thermoplastic polymers, particularly those known for use as a composite matrix. Thermoplastic polymers useful in this invention include polyetherketoneketone polymers (PEKK), polyacrylonitrile (PAN), crystalline thermoplastic polyamides, e.g., poly(hexamethylene adipamide) and poly(ε-caproamide) and amorphous thermoplastic polyamides. Preferred for the practice of the invention are thermoplastic polyamides.

In an oriented shaped article of the invention, the lyotropic polymer makes up a first polymer phase of the articles and the thermally-consolidatable polymer is found within a second polymer phase. Characteristic of the first polymer phase is that it is at least substantially continuous in the direction of orientation of the articles when viewed at a magnification of 9000× with TEM. For a fiber in which the direction of orientation is longitudinal, this structure is visible in FIG. 1 which is a transmission electron micrograph (TEM) at 9000× in the longitudinal direction of a preferred fiber in accordance with the invention. The first polymer phase appears to be darker than the lighter colored second polymer phase. "Continuous in the direction of orientation" and "longitudinally continuous" in the case of fibers is intended to indicate that fibrils of the lyotropic polymer in the first polymer phase extend essentially continuously in the direction of orientation or along the length of the article when viewed at 9000× with TEM.

Preferably, the articles are highly oriented. For fibers of the invention, the orientation angle is preferably less than about 30°. When the lyotropic polymer is PPD-T, the articles preferably have an orientation angle of less than 20°.

Figure 2:
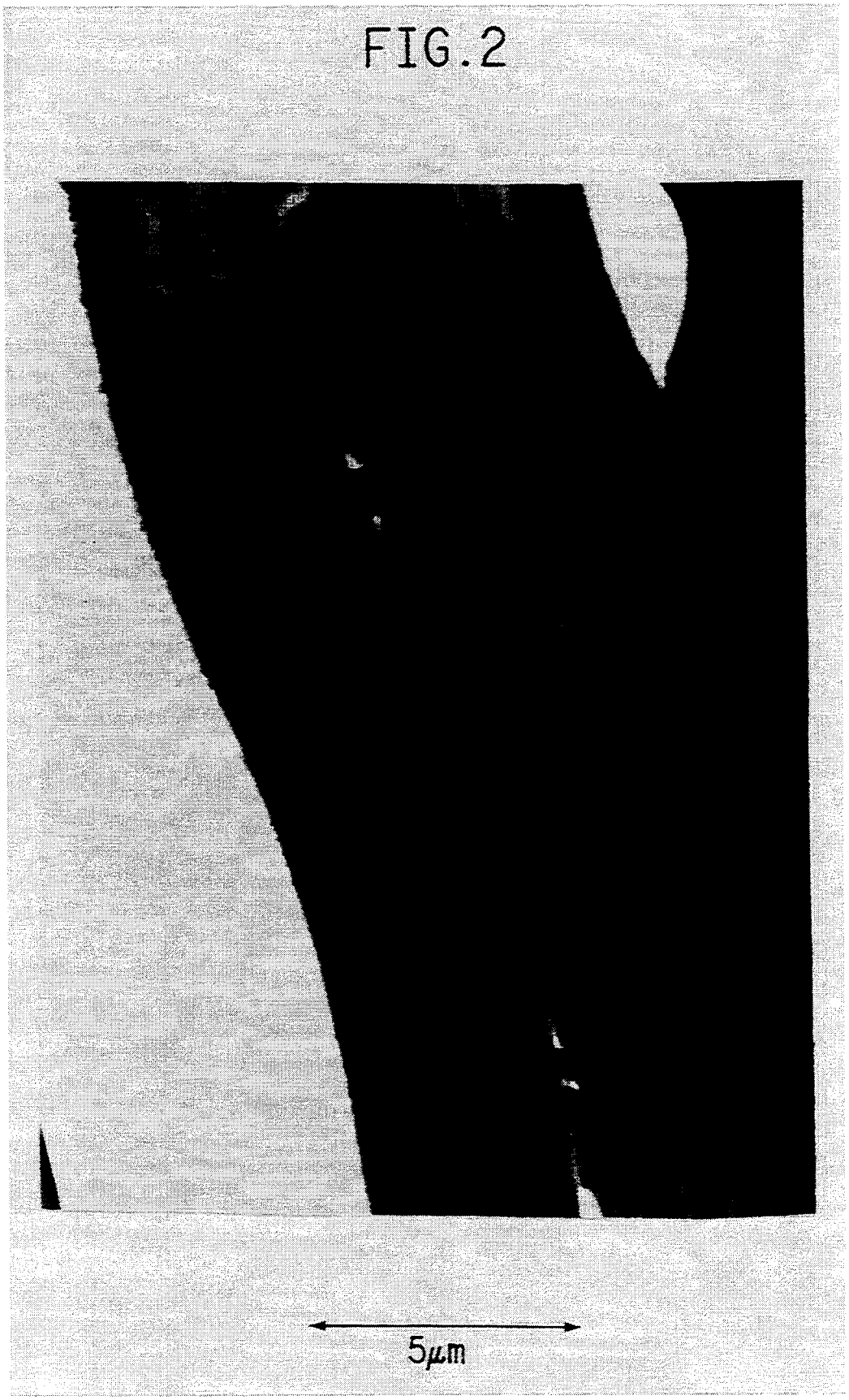
FIG. 2 is a transmission electron micrograph at 9,000× in longitudinal section of a preferred fiber in accordance with the present invention.

The second polymer phase containing the thermally-consolidatable polymer interpenetrates the first polymer phase throughout the article. In the preferred form of the invention in which the lyotropic polymer is PPD-T, it is most preferable for the first and second polymer phases to be co-continuous in the article, i.e., both phases are continuous in the direction of orientation. The co-continuous structure is visible in transmission electron micrographs (TEM) at 9000× of cross-section and longitudinal section. For example FIG. 1 is a TEM of the longitudinal showing the first and second polymer phases propagating continuously along the fiber direction. FIG. 2 is a TEM of the fiber cross-section showing the two polymer phases interpenetrate each other.

The first polymer phase comprises at least about 55 percent and less than about 80 percent by weight of the article and the second polymer phase comprises at least about 20 percent and less than about 45 percent weight of the article. In general, it is necessary for the first polymer phase to have at least 55 percent and preferably greater than 60 percent by weight of the first polymer in order to obtain spinning continuity and good tensile strength in the articles. Generally, less than about 20 percent of the thermally-consolidatable polymer makes it difficult to consolidate the articles.

Oriented shaped articles in accordance with the invention can be produced by first forming a biphasic solution (dope) of the lyotropic polymer and the thermally-consolidatable polymer in an appropriate solvent. It is necessary for the concentration of the total polymer (lyotropic and thermally-consolidatable) concentration to be sufficiently high that the solution is bi-phasic. The bi-phasic solution (dope) is composed of an anisotropic phase consisting primarily of the lyotropic polymer(s) and an isotropic phase consisting primarily of the thermally consolidatable polymer(s). However, the resulting solids concentration should be low enough in the solvent used that the lyotropic polymer does not precipitate out of solution (12 to 20 percent total solids is typical). The bi-phasic solution should be well mixed so that it appears homogeneous to the unaided eye.

In order to obtain articles in accordance with the invention in which the first polymer phase containing the lyotropic polymer is continuous in the direction of orientation, it is necessary for the two phases in the solution to be finely-divided in the blend. The isotropic phase is preferably distributed into domains having a width less than 300 microns, preferably less than 100 microns. While this can be achieved by adding the polymers simultaneously to the solution and mixing with strong agitation over a long period of time, it is preferable to first dissolve the less soluble lyotropic polymer in the solvent and then subsequently add the more soluble thermally-consolidatable polymer. The temperature of the solution prior to adding the thermoplastic polymer must be sufficiently high to insure that the melted solution does not freeze (transform into a crystalline solvate) but should be not be so high that degradation of the polymers occurs in solution. In order to prevent gross phase separation, is is usually necessary to continue agitation of the solution or to form into oriented, shaped articles shortly after the solution is formed.

The solvent employed should be chosen so that it can dissolve enough of the polymers to form a biphasic solution as well as being a common solvent for the thermally-consolidatable polymer. For para-aramids with thermoplastic polyamides, a suitable solvent is sulfuric acid having a concentration between about 99 and 102 percent by weight. For some polymer blends, it is necessary to use a mixed solvent. For example, for PBT and PBO with thermoplastic polyamides, a combination of polyphosphoric acid and methanesulfuric acid or chlorosulfonic acid can be used as disclosed in U.S. Pat. No. 4,810,735. For cellulose triacetate and thermoplastic polyamides, a mixed solvent of trifluoroacetic acid and formic acid can be used.

The biphasic solutions can be used to make oriented, shaped articles in a number of ways such as forming fibers by spinning, extruding the dope into films, or fibridating the dope into fibrids. The processes used to process the solutions into blend articles must be capable of removing the solvent from the high viscosity solutions (the solution viscosity is typically greater than 100 poise). Techniques which are suitable for this task are air gap wet spinning and film extrusion processes where the solution passes through a spinneret or die into an air gap and subsequently into a coagulant bath where the solvent is removed from the blend. In general, fiber spinning and film extrusion processes useful for forming the lyotropic polymer into high tenacity fibers and films are useful for spinning the blend fibers in accordance with the present invention. Fibers of the invention can be produced in accordance with the method disclosed in U.S. Pat. Nos. 3,767,756 and 3,869,429, which are incorporated herein by reference.

The oriented shaped articles of the invention are formable into consolidated parts by the application of heat and pressure. Known techniques for processing "prepreg" are useful for forming consolidated parts from fibers in accordance with the invention. By placing fibers in an appropriate mold and compressing the fibers while maintaining a temperature at or above the melting point, glass transition temperature or reaction temperature of the thermally-consolidatable polymer to form consolidated parts. Unidirectional composites, composites containing fabrics woven from fibers of the invention, composites from discontinuous fibers can be made by such techniques. Fibers which have been pulped or fibrids can be directly made into paper by a wet-lay process. Such papers can be consolidated by heat and pressure into three dimensional composites. Unidirectional composites in accordance with the invention preferably exhibit short beam shear values of greater than about 4 kpsi.

In consolidated parts in accordance with the invention, the morphology of the first polymer phase in the oriented shaped articles used to make the composite is generally preserved in the composite structure while the second phase is consolidated and becomes a somewhat continuous matrix for the first polymer phase. In general, the mechanical properties of the elongated shaped articles translate into the properties of the composites. The mechanical properties in the composites are equal to the properties predicted for short fiber reinforced composites and thus the invention provides the ability to make composites with excellent properties directly from as-spun fibers and films.

The examples which follow illustrate the invention employing the following test methods. Parts and percentages are by weight unless indicated otherwise.

Test Methods

Transmission Electron Microscopy

Transmission electron micrographs (TEM) of the cross-section and longitudinal section of the fiber were prepared using the following procedures.

Samples are prepared by first embedding a well-aligned bundle of fibers (approximately 10 filaments) in epoxy. Specimens to be cross-sectioned are most easily embedded using a BEEM size 00 capsule. A razor is used to make both a slit across the tapered tip of the capsule along a diameter and a "V" cut in the flat top of the capsule. The fiber bundle is inserted through the two cuts so that the bundle axis coincides with the capsule axis. The capsule is then filled with epoxy, the epoxy is cured overnight in a 70 degree C. oven, and the embedded fiber sample is removed from the capsule. In order to prepare specimens to be sectioned longitudinally, the two ends of a fiber bundle are taped to a TEFLON ® plate. A drop of epoxy is placed between the ends of the bundle and allowed to cure overnight in a 70 degree C. oven. A short segment is cut from the epoxied area and attached to the end of a Bakelite stub with epoxy.

Sections 2000 to 2500 Angstroms thick are cut from the embedded fiber specimens using a Du pont MT6000 Ultramicrotome and a diamond knife at a cutting speed of 0.7 mm/sec. In the case of cross-sections, the cutting direction is essentially perpendicular to the long axis of the fiber, and in the case of longitudinal-sections, the cutting direction is essentially parallel to the long axis of the fiber. The fiber sections are then transferred to 3 mm diameter, 200 mesh electron microscope grids.

JEOL 200CX TEM/STEM equipped with a goniometer specimen stage and operated at an accelerating potential of 200 keV is used to examine the fiber sections at the desired magnification (an objective aperature may be used to improve contrast) and the image is recorded on electron image film. The film is placed in a photographic enlarger where the recorded image is enlarged 3X and projected onto photographic film from which a positive print is made.

Tensile Properties

Yarn properties are measured at 21.1° C. and 65% relative humidity which have been conditioned under the test conditions for a minimum of 16 hours. Yarn denier is calculated by weighing a known length of yarn. The tenacity (grams/denier, gpd), elongation (%), initial modulus (gpd) as defined in ASTM D2101 are calculated from the load-elongation curves at 10% strain per minute on sample lengths of 25.4 cm and the measured yarn denier. Before each test, the yarns were twisted. The twist multiplier used to correlate twist per unit of length with linear density for PPD-T yarns (Examples 1–10) was 1.1, where twist multiplier is defined as $$T.M. = \frac{(\text{twist/inch}) \times (\text{denier})^{\frac{1}{2}}}{73}$$

except for the case of the cellulose triacetate yarns in which case the tensile properties were measured for a yarn with 3 twists per inch. Since this was a low denier yarn, the effect of twist per inch does not have a pronounced effect on the measured modulus.

Where single filament properties are reported, tensile properties are determined similarly with a guage length of 2.54 cm for tenacity and elongation and 25.4 cm for modulus. The denier of a single filament was calculated from its fundamental resonant frequency, determined by vibrating a 4.1 cm length of fiber under tension with changing frequency (ASTM D1577 Method B).

Fiber X-ray Orientation Angle

A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film (Catalogue Number 154-2463), in a Warhus pinhole camera. Collimators in the camera are 0.64 mm in diameter. The exposure is continued for about fifteen to thirty minutes (or generally long enough so that the diffraction feature to be measured is recorded at an Optical Density of ~1.0).

A digitized image of the diffraction pattern is recorded with a video camera. Transmitted intensities are calibrated using black and white references, and gray level is converted into optical density. A data array equivalent to an azimuthal trace through the two selected equatorial peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak. Both peaks are measured and the Orientation Angle is taken as the average of the two measurements.

Inherent Viscosity

Inherent Viscosity (IV) is defined by the equation:

$$IV = \ln(\eta rel)/c$$

where c is the concentration (0.5 gram of polymer in 100 ml of solvent) of the polymer solution and $\eta rel$ (relative viscosity) is the ratio between the flow times of the polymer solution and the solvent as measured at 30° C. in a capillary viscometer. The inherent viscosity values reported for PPD-T are determined using concentrated sulfuric acid (96% $H_2SO_4$). CTA inherent viscosities are determined in hexafluoroisopropanol.

Intrinsic Viscosity: (PBT and PBO)

Intrinsic Viscosity $[\eta] = [IV]_{c=o}$

The intrinsic viscosity for PBT and PBO were measured in methanesulfonic acid.

Composite Testing

Tensile testing of composite bars was performed according to the ASTM method D 3039-76; "Tensile Properties of Fiber-Resin Composites". The composite sample size was ½"×6"×0.030-0.050". Two inch long tabs were used. It was preferable to use hydraulic grips to hold the sample during testing. A DSST (dual-sensor strain transducer) consisting of two sensors arranged so as to measure axial strains on the opposite sides of the test specimen was sometimes used for strain measurement.

Flex testing of composite bars was done according to the ASTM method D 790-84a; "Flexural properties of Unreinforced and Reinforced Plastic and Electrical Insulating Materials".

Short beam shear strength was measured according to ASTM D 4255-83; "Inplane Shear Properties of Composite Laminate".

Flex fatigue testing was done using a three-point flex loading and a span to depth ratio 16 to 1 (as described in ASTM D790-84a). A testing frequency of 5 Hz was used and the sample was loaded under a sinusoidal loading. Failure was defined when the bar was broke such that continued loading was not possible.

Domain Size in Spin Dopes

Spin dopes were examined with optical microscopy to determine the biphasic nature of these solutions. For the poly(paraphenylene terephthalamide), polyamide, sulphuric acid dopes, samples were prepared by scraping a thin layer of solidified dope at room temperature. This was placed between two glass slides. The slides were set into a Mettler FP82 hot stage held at about 90 C. When the dope melted, the slides were pushed firmly together using hand pressure. This resulted in a thin, translucent layer of solution. The sample was allowed to relax for about an 1-1.5 hours. For the CTA, PAN, nitric acid solution, the dope was placed between two glass slides. The sample was pressed, using hand pressure, to facilitate a thin sample. The edges of the slides were sealed with Parafilm (TM), to prevent loss of solvent. The sample was allowed to relax overnight at room temperature.

The samples were observed with polarized and cross-polarized light using a Nikon polarizing optical microscope equipped with a camera. It has been shown that static (relaxed) isotropic solutions when placed between crossed polarizing elements will transmit essentially no light. However, anisotropic dopes will transmit light and a relatively bright field is observed. Since these solutions are composed of two phases, one being isotropic and one being anisotropic, the two phases can be distinguished by comparison of observation between polarized and cross polarized light. The samples were viewed and photographed at 100×. Polariod type 57 3000 ASA film was used. Size of the isotropic domains was determined by measurement of isotropic domains on the photographs.

Acetyl Content

The acetyl content of the cellulose triacetate was measured according to ASTM D871 "Cellulose Acetate" Method B "Combined Acetyl or Acetic Acid Content: Heterogeneous Saponification Method".

EXAMPLES 1-10

Figure 5:
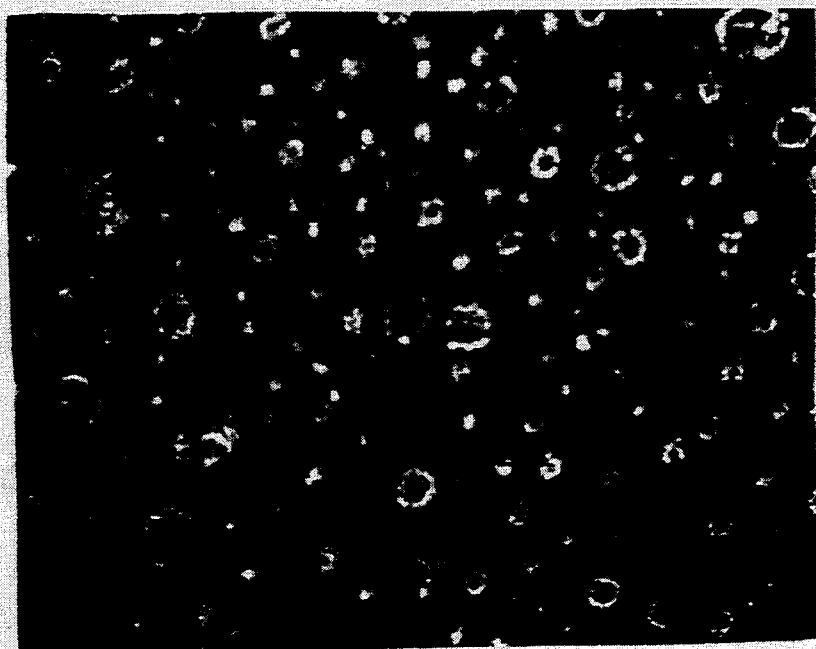
FIG. 5 is an optical micrograph in transmission of a spin dope as employed in example 9.
Figure 6:
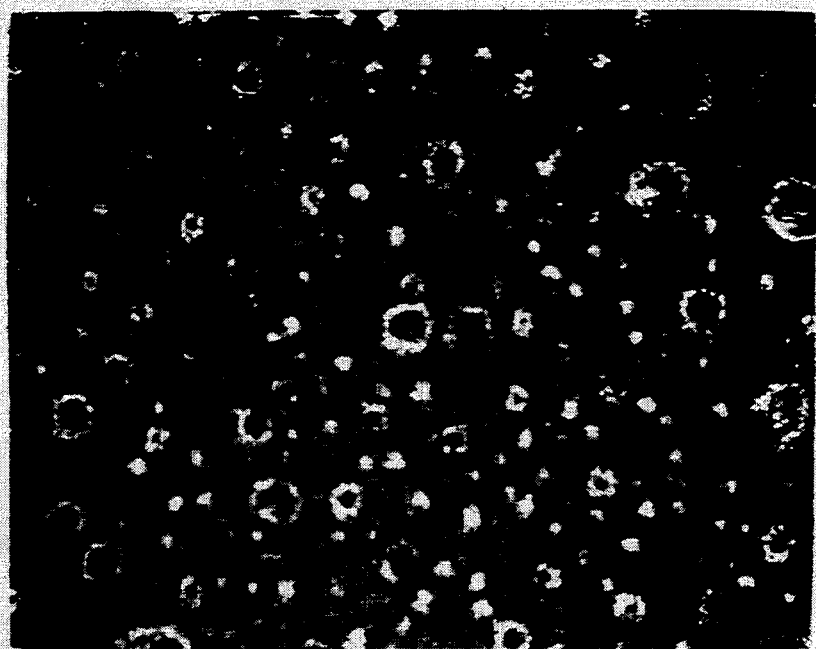
FIG. 6 is an optical micrograph as in FIG. 5 with crossed polarizers.

The following procedures were used to prepare fibers with the composition and spinning conditions given in Tables I and II and measured yarn properties listed in Table III below:

In a high shear Atlantic mixer, sulfuric acid (100.5%) was chilled to 0 to −10° C. for half to three quarters of an hour forming a slush. Dry poly(p-phenylene terephthalamide)(PPD-T) crumb was added to chilled sulfuric acid and mixed to disperse the crumb throughout the mixture. The mix was heated to about 70° C. and mixed for an hour under 30 in Hg vacuum. Then, the temperature was raised to about 80° C. and mixed for an additional hour and the matrix polymer was added to this solution, and mixed at about 80° C. for a half hour under 30 in Hg vacuum. The dope was allowed to degass for a half hour under vacuum at 80° C. The spin dope prepared appeared homogeneous to the unaided eye, exhibits stir opalescence, and depolarizes polarized light. Optical micrographs of the spin dope of Example 9 are shown in FIG. 5 and 6. The isotropic phase is dispersed through the anisotropic phase in domains having a size of about 50–100 microns.

The spin dope was immediately pumped to the spin cell while maintaining the process temperature at 80° C. The transfer lines and spinneret pack were maintained at approximately the same temperature as the pot where the processing dope is prepared. The dope was pumped through a filter pack consisting of a dynalloy filter and several fine mesh grids. The dope then passes through a spinneret having a hole diameter of 2.5 mils. The dope was spun at 75° to 80° C. through a 0.25 inch air gap into a coagulation stream (as described in Yang, U.S. Pat. No. 4,430,559). Water at about 0° C. is used as the coagulating fluid. A spin stretch factor (SSF), i.e., velocity of wind up/velocity of exit, of about 6.0 or slightly higher was used to prepare the high modulus composite fibers. To remove and neutralize acid, the fiber was passed over wash roll and washed with water and dilute NaOH solution. The fiber was collected wet or passed over drying rolls as indicated in Table II and collected.

The transmission electron micrographs of the longitudinal section and cross-section and of the fiber produced from Example 1 are shown in FIGS. 1 and 2, respectively. The cross-section of the filament is observed to have an interconnected "co-continuous" structure of both the PPD-T and the amorphous polyamide. The longitudinal section of the filament shows a continuous phase of poly(p-phenylene teraphalamide) along the fiber length.

TABLE I

| Example | Aramid | Resin | Resin (wt %) | Solids (wt %) |
|---|---|---|---|---|
| 1 | PPD-T | Polyamide 1 | 30 | 18.5 |
| 2 | PPD-T | Polyamide 2 | 30 | 19.0 |
| 3 | PPD-T | Polyamide 2 | 40 | 17.0 |
| 4 | PPD-T | Polyamide 2 | 20 | 19.4 |
| 5 | PPD-T | Polyamide 2 | 35 | 19.0 |
| 6 | PPD-T/2,6 N (90/10) | Polyamide 2 | 30 | 19.0 |
| 7 | PPD-T | PEKK | 30 | 19.0 |
| 8 | PPD-T | Polyamide 3 | 30 | 19.0 |
| 9 | PPD-T | Polyamide 4 | 30 | 19.0 |
| 10 | PPD-T | Polyamide 2 | 30 | 19.0 |

| Code | CHEMICAL STRUCTURE | Tg | Tm |
|---|---|---|---|
| Polyamide 1 | HMD-6 | 50 C | 265 C |
| Polyamide 2 | PACM/HMD//T/I 4/96//30/70 | 130 C | — |
| Polyamide 3 | PACM-12 | 145 C | 285 C |
| Polyamide 4 | PACM/HMD//T/I 45/55//60/40 | 160 C | — |
| PEKK | Poly(ether ketone ketone) | | | where:
PACM = bis(p-aminocyclohexyl) methane
HMD = hexamethylene diamine
T = terephalic acid
I = isophalic acid
6 = adipic acid
12 = dodecanedioic acid

TABLE II

| Example | Mix/ proc. Temp. | Solvent | Dry Roll Temp | SSF |
|---|---|---|---|---|
| 1 | 70–80° C. | H2SO4 | NONE | 6.5 |
| 2 | 70–80° C. | H2SO4 | 181° C. | 6.0 |
| 3 | 70–80° C. | H2SO4 | 158° C. | 6.0 |
| 4 | 70–80° C. | H2SO4 | 158° C. | 6.0 |
| 5 | 70–80° C. | H2SO4 | 180° C. | 6.0 |
| 6 | 70–80° C. | H2SO4 | NONE | 6.8 |
| 7 | 70–80° C. (90° C.) | H2SO4 | NONE | 3.4 |
| 8 | 70–80° C. | H2SO4 | 180° C. | 6.0 |
| 9 | 70–80° C. | H2SO4 | 180° C. | 6.0 |
| 10 | 70–80° C. | H2SO4/MSA (70 w/30 w) | 179° C. | 6.0 |

TABLE III

| | (Yarn Properties) | | | |
|---|---|---|---|---|
| Example | Tenacity (gpd) | Elongation (%) | Modulus (gpd) | OA |
| 1 | 16.9 | 2.5 | 636 | 10.5 |
| 2 | 16.6 | 2.4 | 583 | |
| 3 | 7.2 | 1.9 | 430 | 16.2 |
| 4 | 15.8 | 2.6 | 685 | 15.6 |
| 5 | 13.5 | 2.1 | 637 | |
| 6 | 13.4 | 3.3 | 428 | |
| 7 | 12.0 | 3.5 | 273 | 18.9 |
| 8 | 6.9 | 2.2 | 323 | 18.4 |
| 9 | 16.4 | 2.6 | 620 | 13.8 |
| 10 | 10.2 | 2.3 | 473 | |

EXAMPLE 11

This example illustrates the preparation of a blend fiber containing 60 wt. % poly(p-phenylene terephthalamide) (PPD-T) and 40 wt. % amorphous aliphatic-aromatic polyamide.

A spin solution was prepared according to the procedure described in Examples 1–10 except that the blend solution contained 18.5 wt. % polymers. Initially, 52.9 lb. 100% sulfuric acid was stirred in a batch mixer and cooled to −9° C. in about 40 minutes. The stirrer was then stopped. A polymer mixture of 7.2 lb. of PPD-T polymer and 4.8 lb. of an amorphous nylon (a copolymer of hexamethylene diamine, bis(p-aminocyclohexyl)methane, isophthalic acid, and terephthalic acid in a 96/4/70/30 mole ratio —polyamide 2) was added to the batch mixer, and stirring was resumed. The solution mixture temperature was then increased to 70° C., and mixing continued for another hour. The solution was deaerated under vacuum about one hour. The resulting solution was anisotropic. When examined by an optical microscope under cross polarized light, the solution exhibited intense depolarization and a uniform domain structure with no evidence of gross separation of either polymer phase. The average domain size of the microscopic specimen was estimated to be on the order of 100 microns. The solution gave an endothermic peak of 73.7° C., and an exothermic peak of 32.3° C. as measured by differential scanning calorimetry. These phenomena are characteristic of an anisotropic solution.

The solution was maintained at 75°–80° C. and extruded at 160 g/min through a spinneret with 1000 holes of 0.0025 in. (0.063 mm) diameter. The extruded filaments passed through a 0.25 in. (6.3 mm) long air gap into a coagulation bath of water into a spin tube as described in U.S. Pat. No. 4,340,559 (Yang). The coagulated filaments were washed with water and neutralized with 0.4% sodium hydroxide solution on rotating rolls. The neutralized filaments were then dried on steamheated rolls at about 140° C. and about 2500 g total threadline tension. A dry 1500 denier yarn was thus wound up by a winder at 200 yd/min (183 m/min). The resulting yarn gave 12.7 gpd tenacity, 2.9% elongation at break, and 444 gpd modulus.

EXAMPLE 12

Cellulose triacetate (CTA, having an acetyl content of 43.7% and an inherent viscosity of 6.0 dl/g in hexafluoroisopropanol at 30 degrees C.) and the polyamide (a copolymer of hexamethylene diamine, bis(p-aminocyclohexyl)methane, isophthalic acid, and terephthalic acid in a 96/4/70/30 mole ratio) were dried overnight in a vacuum oven at 80 degrees C. under a nitrogen purge. An organic solvent composed of trifluoroacetic acid (TFAA) and formic acid (FA) in a 79/21 weight ratio were mixed together in a glass beaker. 65 parts by weight of the TFAA/FA solvent mixture was then added to 24.5 parts by weight of CTA in a 500 cc twin blade shear mixer. The mixer was pre-cooled to −5 degrees C. by an external refrigeration unit in order to minimize degradation of the CTA by the acid. Mixing was begun and typically continued for 2 hours in order to thoroughly wet the CTA. 10.5 parts by weight of the polyamide was then added to the mixer and mixing was continued until the next day. Occasionally the mixer was opened and a spatula was used to scrape any undissolved polymer that was stuck to the mixer walls and blades back into the rest of the spin dope. The resulting spin dope consisted of 35 weight percent polymer (70 weight percent CTA/30 weight percent polyamide) in 65 weight percent solvent (79 weight percent TFAA/21 weight percent FA). The spin dope appeared homogeneous and exhibited shear opalescence. In addition, long fibers could be pulled from the spin dope with a spatula.

The spin dope was then transferred to the spin cell and spun at room temperature and at a constant throughput rate of 0.2 ml/min through a spinneret with ten 0.005 inch diameter holes, across a 0.75 cm air-gap, and into a coagulating bath of methanol chilled to −10 degrees C. The fiber was wound up on a bobbin at a speed of 6.3 m/min resulting in a spin-stretch factor of 4. The fiber was washed continuously on the windup bobbin with water, soaked in water overnight to extract residual solvent, and subsequently air dried.

The yarn tensile strength/elongation/modulus of the as-spun composite fiber (having three twists/inch) was 4.1 gpd/5%/100 gpd. The orientation angle was 18 degrees. Examination of the cross-section of the fiber at 9000× by transmission electron microscopy (TEM) revealed interpenetrating phases of CTA and polyamide. TEM examination of a longitudinal-section of the fiber at 9000× revealed that the CTA and the polyamide were continuous along the length of the fiber.

EXAMPLE 13

Figure 7:
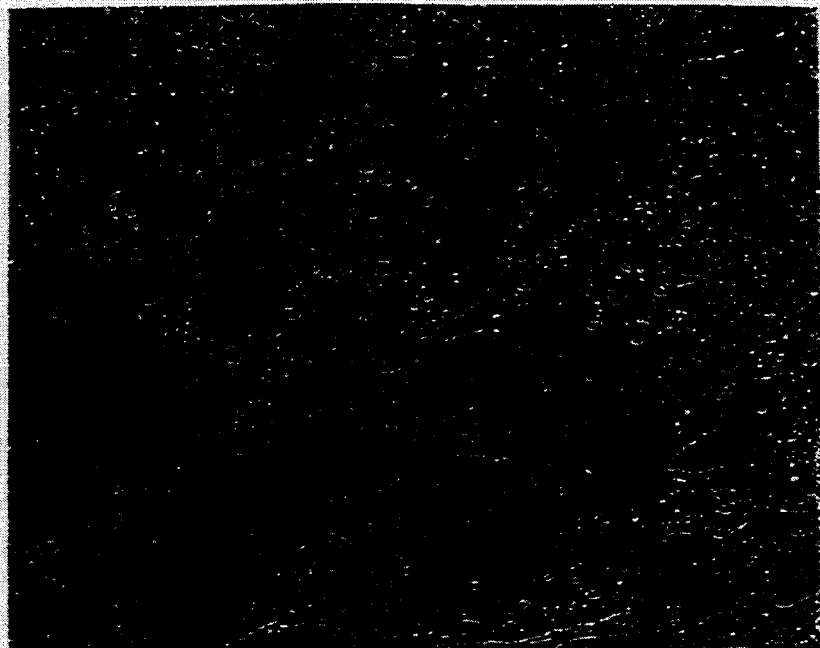
FIG. 7 is an optical micrograph in transmission of a spin dope as employed in Example 13.
Figure 8:
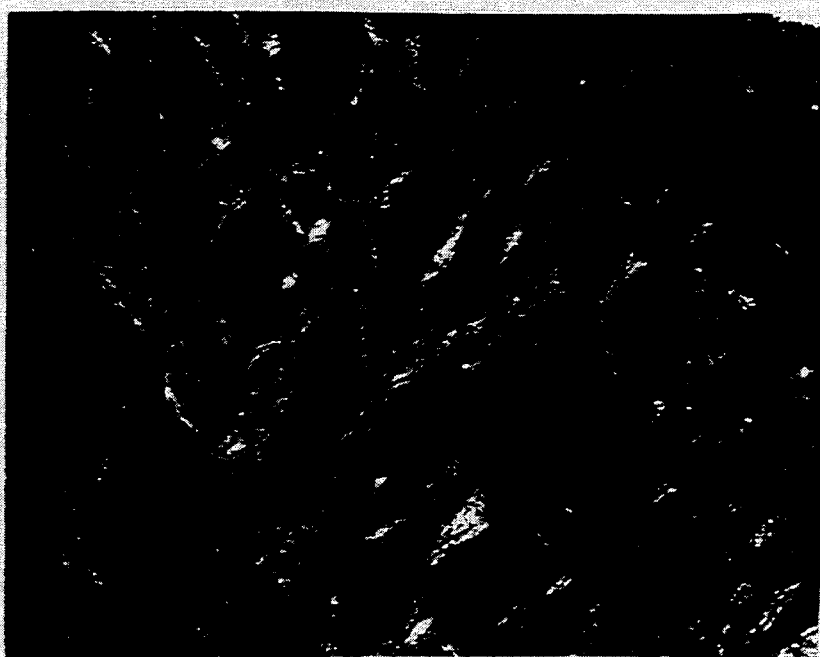
FIG. 8 is an optical micrograph as in FIG. 7 with crossed polarizers.

Cellulose triacetate (CTA, having an acetyl content of 43.7% and an inherent viscosity of 6.0 dl/g in hexafluoroisopropanol at 30 degrees C.) and polyacrylonitrile (PAN) were dried overnight in a vacuum oven at 80 degrees C. under a nitrogen purge. An inorganic solvent composed of nitric acid and water in a 87.5/12.5 weight ratio were mixed together in a glass beaker. 70 parts by weight of the aqueous nitric acid mixture was then added to 21 parts by weight of CTA and 9 parts by weight of PAN in a 500 cc twin blade shear mixer. The mixer was pre-cooled to 5 degrees C. by an external refrigeration unit in order to minimize degradation of the CTA by the acid. Mixing was begun in the morning and continued until the next day. Occasionally the mixer was opened and a spatula was used to scrape any undissolved polymer that was stuck to the mixer walls and blades back into the rest of the spin dope. The resulting spin dope consisted of 30 weight percent polymer (70 weight percent. CTA/30 weight percent polyacrylonitrile) in 70 weight percent solvent (87.5 weight percent nitric acid/12.5 weight percent water). The spin dope appeared homogeneous and exhibited shear opalescence. In FIG. 7 and 8 optical micrographs of the spin dope show the two phases are interdispersed. The width of domains of the isotropic phase is on the order of 100–300 microns. In addition, long fibers could be pulled from the spin dope with a spatula.

The spin dope was then transferred to the spin cell while pulling vacuum to deaerate and spun at room temperature and at a constant throughput rate of 0.4 ml/min through a spinneret with ten 0.005 inch holes, across a 1 cm air-gap, and into a coagulating bath of 75/25 volume ratio methanol/water chilled to 0 degrees C. The fiber was wound up on a bobbin at a speed of 12.8 m/min resulting in a spin-stretch factor of 4. The fiber was washed continuously on the windup bobbin with water, soaked in water overnight to extract residual solvent, and subsequently air dried.

Figure 3:
FIG. 3 is a transmission electron micrograph at 9,000× in cross-section of another fiber in accordance with the present invention.
Figure 4:
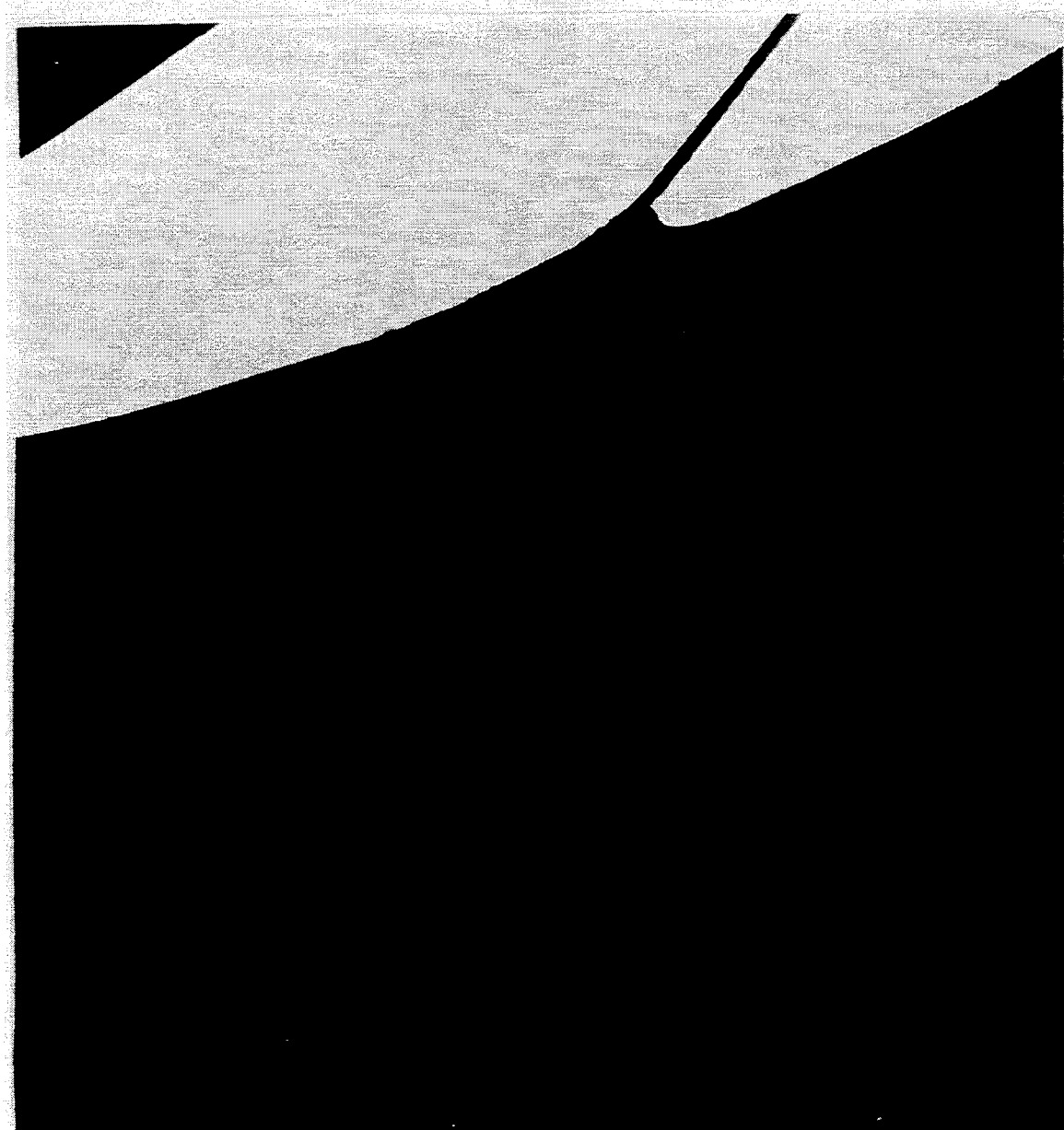
FIG. 4 is a transmission electron micrograph at 9,000× in longitudinal section of another fiber in accordance with the present invention.

The single filament tensile strength/elongation/modulus of the as-spun composite fiber was 6.1 gpd/6%/129 gpd. The orientation angle was 27 degrees. Referring to FIG. 3, examination of the cross-section of the fiber at 9000× by transmission electron microscopy (TEM) revealed isolated domains of CTA. TEM examination of a longitudinal-section of the fiber at 9000× as shown in FIG. 4 revealed that the CTA and the polyacrylonitrile were continuous along the length of the fiber.

EXAMPLE 14

15 parts by weight of thermoplastic polyamide were added to 85 parts by weight of MSA in a glass jar and stirred at room temperature using a simple polytetrafluoroethylene coated magnetic stirrer. The thermoplastic polyamide employed is an amorphous copolymer of (48 tt) bis(p-aminocyclohexyl)methane, isophthalic and dodecanedioic acids in a 100/60/40 mol percent basis. The solution was a brown viscous liquid. 60.5 g of the solution was poured into an Atlantic Mixer (Model No. 2CV, Capacity: 150 cc). Then 61.8 grams of a 14.5 wt. % dope of PBT (19.6 dL/g intrinsic viscosity) in PPA were added to the mixture with the mixer operating at low speed and without applying external heating. The PBT/PPA dope broke up and "dissolved" into the polyamide-MSA solution. Mixing was continued into the next day, when the mixture became homogeneous. The resulting quaternary solution or dope exhibited shear opalescence. It was stirred and deaerated under vacuum overnight. The dope was transferred to a spin cell and spun at 54° C. through a 0.25 inch air gap into an ice water bath to extract solvent. The dope was spun from a 10-hole spinneret (0.004 in holes) at 7.5 m/min. The throughput rate was 0.02 ml/min/hole. To ensure complete removal of the acid solvents, bobbins of yarn were immersed in water overnight and then air dried. The as-spun composite yarn (PBT/polyamide, 50/50 by weight or 42/58 by volume) had the following filament tensile properties (denier, tenacity, elongation, modulus) (D/T/E/M):66 denier, 4.3 gpd, 1.4%, 344 gpd. and an orientation angle of 15°. Thermal stability was evaluated by threading the yarn through a horizontal hot tube with one end tied and a 10-gram load on the other end. The temperature was raised to 716° C. over a period of 3 hours 30 minutes at which point the yarn broke.

EXAMPLE 15

15 grams of an amorphous thermoplastic polyamide, a copolymer of hexamethylene diamine, (20tt) bis(p-aminocyclohexyl)methane, isophthalic and terephthalic acids in 96/4/70/30 mol percent basis, was dissolved in 85 grams of MSA at room temperature. 72.3 grams of the solution was mixed with 73.2 grams of the same PBT/PPA dope used in Example 14 to give PBT/polyamide weight ratio of 50/50 and MSA/PPA solvents ratio of 50/50. The mixing was done without external heat. After several hours, a homogeneous quaternary spin dope was obtained. It was shear opalescent and light metallic green. Mixing was continued to the next day when vacuum was applied to deareate the dope. After remaining quiescent over a weekend, some phase separation took place. The dope was mixed for 2.5 hours before transferring to the spin cell. It was spun at 60° C. from a 10-hole spinneret of 0.005 in hole diameter through a 0.75 in air gap at 7.5 m/min with spin-stretch factor of 4.7 into ice water. The yarn was immersed in water for several days, then in acetone to remove any residual MSA and then air dried. The 50/50 PBT/polyamide composite fiber tensile properties (T/E/M) are: 3.7 gpd, 0.6%, 390 gpd. The same thermal stability test was made as in Example 14 and the yarn survived till 723° C. In a separate experiment, a higher PBT to polyamide ratio of 62/38 was used. The spun composite fiber had T/E/M properties of 5.7 gpd/0.82/691 gpd.

EXAMPLE 16

A solution was made using 30 grams of the polyamide of Example 14 and 170 grams of MSA. 94.2 grams of this solution were mixed with 141.3 grams of the same PBT/PPA dope used in the above examples to make a spin dope where the PBT/polyamide ratio was 60/40 by weight or 53/47 by volume and MSA/PPA ratio of 40/60. The homogeneous quaternary spin dope was heated to 60° C. to reduce viscosity for transfer to the spin cell. Yarn was spun at 75° C. through a 0.375 in air gap, at 7.5 m/min using 10-hole spinneret with 0.005 in holes. Spinning was excellent. After overnight immersion in water, the bobbin of yarn was immersed in acetone the next night to extract any residual MSA. The dried composite fiber T/E/M properties are 3 gpd/1.0%/342 gpd.

EXAMPLE 17

A spin dope of PBT and the polyamide of Example 14 at a polymer ratio of 59.2/40.8 by weight (51/49 by volume) was made using 54.3 grams of the polyamide/MSA solution of Example 16 and 81.4 grams of the same PBT/PPA dope used in the above examples. The resulting quaternary spin dope with a MSA/PPA ratio of 40/60 was mixed without external heating. On the following day, the temperature was raised to and kept at 75° C. for 1.5 hours to reduce viscosity before transfer to the spinning cell. Yarn was spun at 75° C., through a 0.5 in air gap, at 7.5 m/min using a 10-hole spinneret having 0.005 in holes. The as-spun composite fiber had T/E/M properties of 7.3 gpd/1.5%/586 gpd.

EXAMPLE 18

A quaternary spin dope containing cis-PBO and the polyamide of Example 14 in a 66/34 weight ratio (59/41 by volume) was made using 65.2 grams of 15% of the polyamide in MSA and 136.2 grams of 14.1% cis-PBO (intrinsic viscosity of 16.6 dL/g) in PPA. The mixture with a MSA/PPA ratio of 32/68 was mixed overnight under house vacuum (24 in vacuum) without applying external heat. The resulting quaternary dope was heated to 60° C. the next day to improve flowability for filling the spin cell. The dope was shear anisotropic. Yarn was spun at 60° C. through a 0.75 in air gap at 7.5 m/min using a 10-hole (0.005 in holes) spinneret. The composite fiber has the following T/E/M tensile properties: 8.4 gpd/2.2%/324 gpd. The fiber orientation angle is 17°.

EXAMPLE 19

Unidirectional test bars were prepared by winding the PBT/polyamide yarn of Example 14 around a 7 in×7 in×0.25 in plate such that the yarn was laid parallel and 3.5 layers thick. A layer of polyimide film ("Kapton"—E. I. du Pont de Nemours and Co., Inc.) coated with a mold release agent ("Frekote 33") was placed on the plate before and after the yarns were wound. Finally, a thin metal sheet was placed on each side of the structure. This whole assembly was then heated and pressed at 315° C. and 6,000 pounds (122 psi) for 15 minutes. Two (2) coherent films were obtained. 0.25 in×6.0 in strips were cut parallel to the fiber direction and 4.8 g of the strips were stacked inside an open-ended H-shaped female mold. With the male part of the mold and 0.118 in thick shims in place, pressure was applied initially at 300 lbs (200 pi), raised to a maximum of 5,400 lbs (3,600 psi) at 315° C. and released during the cool down period. The resulting bar, 0.25 in×6 in×0.113 in, has a flex strength/modulus of 42 kpsi/9.6 mpsi and short-beam-shear strength of 2.4 kpsi. A thin strip, about 0.78 mm thick, was removed from the bar. It exhibited an orientation angle of 13°.

EXAMPLE 20

A direct winding technique was also used for making unidirectional test bars. The same H-shaped mold was mounted on a rotating shaft and the PBT/polyamide yarn of Example 15 was wound into the open ended female section 0.25 in×6.0 in area on both sides of the mold. After 4.7 g grams of yarn was wound, the male section was placed on both sides of the mold and cold pressed at 5,000 pounds to compact the fiber into two bars. The exposed fiber ends at both ends of the mold were cut with a razor blade. Then the mold was opened and the two bars were stacked together and hot pressed in the mold using 0.1195 in shim thickness at 315° C. and 5,000 pounds (3.333 psi) for 20 minutes. An initial cold pressure of only 500 pounds was used, but the pressure was maintained at 6,000 pounds during cool down. Final bar dimensions were 0.1035 in×0.25 in×6 in. Measured flex strength-modulus properties are 54 kpsi/8.8 mpsi with short-beam-shear strength (SBSS) of 4.4 kpsi. A thin strip, about 0.68 mm thick, was removed from the bar. It exhibited an orientation angle of 11°.

By building successive layers of coating on a mold, followed by extraction and drying, an in situ composite of complex shape is easily prepared from the quaternary dopes. A small cylinder was prepared by coating a stainless steel rod with a dope of the invention containing 15% solids. Each coating was extracted by washing in water and drying with a hot air gun. After application of four coats, the cylinder was consolidated using a hot air gun at 315°C.

Fibrids were made by mechanical shear precipitation of dopes of the invention (5 grams dope into 300 mls of water in a Waring blender) and small paper samples were prepared. A slurry was made by blending in a blender 0.5 grams of fibrids in 500 ml water. The slurry was filtered using a #40 filter paper in a 9-cm diameter Buchner funnel. The wet paper, about 3 in diameter, was then cold pressed at 8,000 pounds pressure. Films were produced from these papers by consolidating at 315° C. and 100 psi.

EXAMPLE 21

The yarn of Example 2 was wound around an 8"×7"×¼" aluminum plate with rounded edges. The wound plate was compression molded under a strong nitrogen purge at 200° C./50 psi for five minutes. The partially consolidated sheet was then cut and stacked unidirectionally into 6"×3" or 6"×½" mold. The molding conditions were 300° C./1000 psi for 15 minutes. The 6"×3" plaque was cut into 6"×½" strips. The composite sample prepared had a tensile strength of 198 ksi and a tensile modulus of 10.2 Msi. The flex modulus was 9.2 Msi and the flex strength was 102 ksi. The short beam shear strength was measured to be 7.9 and 9.7 ksi. The tensile and flex performance of the composite bar prepared with the yarn of this invention is comparable to conventional Kevlar ®/polyamide composites. The flex fatigue performance of this composite sample was evaluated and under cyclic loading from 8% to 80% of its failure load. The sample was found to fail after 115,000 cycles. This is outstanding in comparison to conventional Kevlar ®/polyamide composite, which under similar loading fail at about one third the value.

When molding the card wound yarn, it is preferable to use the minimum pressure and temperature which will produce a handleable sheet. That temperature and pressure will be dependent upon the matrix resin. This results in improved adhesion, and lower consolidation pressures in the final part.

We claim:

1. An oriented, shaped article comprising 55% to 80% by weight of a first polymer phase consisting essentially of at least one lyotropic para-aramid polymer and 20% to 45% by weight of a second polymer phase consisting essentially of at least one thermoplastic polyamide, said first polymer phase being longitudinally continuous fibrils extending along the length of the article in the direction of orientation of said article when viewed at a magnification of 9000× in a transmission electron micrograph and with said second polymer phase interpenetrating said first polymer phase throughout said article, wherein said article is formed from a biphasic spinning dope having an anisotropic phase consisting essentially of the lyotropic para-aramid polymer and an isotropic phase consisting essentially of the thermoplastic polyamide.

2. The oriented, shaped article of claim 1 wherein said article comprises at least about 60% and less than about 80% by weight of said first polymer phase.

3. The oriented, shaped article of claim 1 wherein said first polymer phase and said second polymer phase are co-continuous in said article.

4. The oriented, shaped article of claim 3 wherein said para-aramid polymer is poly(paraphenylene terephthalamide).

5. The oriented, shaped article of claim 1 in the form of a fiber.

6. The oriented, shaped article of claim 5 wherein said fiber has an orientation angle of less than about 30°.

7. The oriented, shaped article of claim 1 in the form of a film.

8. A fiber comprising 55% to 80% by weight of a first polymer phase consisting essentially of at least one para-aramid polymer and 20% to 45% by weight of a second polymer phase consisting essentially of at least one thermoplastic polyamide, said first polymer phase being longitudinally continuous fibrils extending along the length of said fiber when viewed at a magnification of 9000× in a transmission electron micrograph and with said second polymer phase interpenetrating said first polymer phase throughout the fiber, wherein said fiber is formed from a biphasic spinning dope having an anisotropic phase consisting essentially of the para-aramid polymer and an isotropic phase consisting essentially of the thermoplastic polyamide.

9. The fiber of claim 8 wherein said fiber comprises at least about 60% and less than about 80% of said first polymer phase.

10. The fiber of claim 8 wherein said first polymer phase and said second polymer phase are co-continuous in said fiber.

11. The fiber of claim 8 wherein said para-aramid polymer has an inherent viscosity of at least about 3 dl/g.

12. The fiber of claim 8 wherein said para-aramid polymer is poly(paraphenylene terephthalamide) having an inherent viscosity of at least about 4 dl/g.

13. The fiber of claim 8 having a tenacity of at least about 5 g/d.

14. The fiber of claim 8 having crystalline regions in said first polymer phase with orientation angle of less than about 30°.

15. The fiber of claim 8 having crystalline regions in said first polymer phase with orientation angle of less than about 20°.

16. A consolidated part having been formed by the application of heat and pressure to shaped articles as set forth in claim 1.

17. The consolidated part of claim 16 wherein said part is a unidirectional composite having a shoot beam shear of greater than about 4 kpsi.

18. A consolidated part having been formed by the application of sufficient heat and pressure to fibers as set forth in claim 8.

19. The consolidated part of claim 18 wherein said part is a unidirectional composite having a short beam shear of greater than about 4 kpsi.

* * * * *